United States Patent
Kondo et al.

(10) Patent No.: US 10,396,445 B2
(45) Date of Patent: Aug. 27, 2019

(54) STRUCTURE FOR ARRANGING PLANAR ANTENNA UNIT IN VEHICLE

(71) Applicant: YAZAKI CORPORATION, Tokyo (JP)

(72) Inventors: Hiroki Kondo, Susono (JP); Mizuki Shirai, Susono (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/274,376

(22) Filed: Sep. 23, 2016

(65) Prior Publication Data
US 2017/0093027 A1    Mar. 30, 2017

(30) Foreign Application Priority Data

Sep. 25, 2015   (JP) ................. 2015-188131

(51) Int. Cl.
*H01Q 1/32* (2006.01)
*H01Q 1/42* (2006.01)
(Continued)

(52) U.S. Cl.
CPC ............ *H01Q 1/3275* (2013.01); *H01Q 1/40* (2013.01); *H01Q 1/42* (2013.01); *H01Q 9/285* (2013.01); *H01B 7/04* (2013.01); *H04B 1/3822* (2013.01)

(58) Field of Classification Search
CPC .... H01Q 13/08; H01Q 1/3275; H01Q 1/3216; H01Q 1/3291; H01Q 1/085;
(Continued)

(56) References Cited

U.S. PATENT DOCUMENTS 4,918,261 A * 4/1990 Takahashi ............... F16L 3/08
                                                 174/135
5,402,134 A * 3/1995 Miller ................. H01Q 1/3275
                                                 343/713
(Continued)

FOREIGN PATENT DOCUMENTS

JP    62163158 U    10/1987
JP     554104 U     7/1993
(Continued)

OTHER PUBLICATIONS

Office Action dated Aug. 22, 2017, by the Japanese Patent Office in counterpart Japanese Application No. 2015-188131.
(Continued)

Primary Examiner — Ricardo I Magallanes
(74) Attorney, Agent, or Firm — Sughrue Mion, PLLC

(57) ABSTRACT

A structure for arranging in a vehicle a planar antenna unit including a planar antenna provided in a roof of a vehicle is provided. The planar antenna unit includes: a planar antenna including an antenna which receives a radio wave from an outside and an amplifier which amplifies the radio wave received by the antenna; and a long line which outputs a radio wave signal amplified by the amplifier. The planar antenna and the line are formed into a sheet-like structure. The line is disposed within a pillar of the vehicle such that a leading end portion of the line extends to a position beyond a lower end of the pillar.

9 Claims, 5 Drawing Sheets

(51) Int. Cl.
*H01Q 9/28* (2006.01)
*H01Q 1/40* (2006.01)
*H01B 7/04* (2006.01)
*H04B 1/3822* (2015.01)

(58) Field of Classification Search
CPC ....... H01Q 1/32–3291; H05K 7/20845; H01B 7/04; H01B 7/041; B60R 2011/0022; B60R 11/0022; H04B 7/04
See application file for complete search history.

(56) References Cited

U.S. PATENT DOCUMENTS

| | | | |
|---|---|---|---|
| 2003/0030586 A1 | 2/2003 | Suzuki et al. | |
| 2010/0231468 A1* | 9/2010 | Ogino | H01Q 1/1271 343/713 |
| 2013/0249748 A1* | 9/2013 | Togura | H01Q 1/22 343/713 |
| 2014/0340279 A1* | 11/2014 | Bayram | H01Q 1/248 343/861 |
| 2015/0283962 A1 | 10/2015 | Kobayashi et al. | |
| 2015/0311586 A1* | 10/2015 | Andrews | H01B 13/06 343/906 |
| 2015/0380916 A1* | 12/2015 | Shimada | B60R 16/0207 174/72 A |
| 2016/0079661 A1* | 3/2016 | Ito | H01Q 1/38 343/713 |

FOREIGN PATENT DOCUMENTS

| | | | | |
|---|---|---|---|---|
| JP | 9162571 | A | 6/1997 | |
| JP | 200378320 | A | 3/2003 | |
| JP | 2004172875 | A | 6/2004 | |
| JP | 2004-289578 | A | 10/2004 | |
| JP | 200736446 | A | 2/2007 | |
| JP | 2007-158462 | A | 6/2007 | |
| JP | 2007-230264 | A | 9/2007 | |
| JP | 2009118268 | A | 5/2009 | |
| JP | 2010-109905 | A | 5/2010 | |
| JP | 2014113022 | A | 6/2014 | |
| JP | 5624941 | B2 * | 11/2014 | B60R 11/02 |

OTHER PUBLICATIONS

Communication dated Feb. 13, 2018, from the Japanese Patent Office in application No. 2015-188131.
Office Action dated May 8, 2018, issued by the Japanese Patent Office in counterpart Japanese Patent Application No. 2015-188131.
Decision to Decline the Amendment dated May 8, 2018, issued by the Japanese Patent Office in counterpart Japanese Patent Application No. 2015-188131.

* cited by examiner

STRUCTURE FOR ARRANGING PLANAR ANTENNA UNIT IN VEHICLE

CROSS-REFERENCE TO RELATED APPLICATION(S)

This application is based on and claims priority from Japanese Patent Application (Application No. 2015-188131) filed on Sep. 25, 2015, the entire contents of which are incorporated herein by reference.

BACKGROUND

1. Field of the Invention

The present invention relates to a structure for arranging a planar antenna unit in a vehicle.

2. Description of Related Art

Conventionally, various types of antennas have been provided on vehicles. Due to the fact that the body of a vehicle is made of metal, an antenna is provided on an exterior portion (for example, an outer side of a roof) or on the surface of a glass portion of a vehicle so that the reception of radio waves is not disturbed.

Additionally, there have been proposed planar antenna units including a planar antenna (refer to JP-A-2004-289578, for example). Such a planar antenna unit is such that an antenna which receives a radio wave from the outside, an amplifier which amplifies the radio wave which the antenna receives and a line which outputs the radio wave signal which is amplified by the amplifier are formed into a sheet-like structure.

SUMMARY

In recent years, resin is used much for vehicle bodies. This reduces the risk of the reception of radio waves being disrupted by the metallic vehicle bodies and then allows an antenna to be provided inside the vehicle body. Thus, the planar antenna unit described in JP-A-2004-289578 can be provided, for example, in a narrow gap in a roof portion which lies inwards of the vehicle body.

Even in the event that such a planar antenna unit is provided in the location described above, however, the connecting work of connecting the planar antenna unit with onboard equipment remains the same as the conventional connecting work, that is, the connecting work includes: a) firstly, a line of the planar antenna unit is connected with an electric wire; and b) the connected electric wire is led to the onboard equipment for connection with the onboard equipment. Namely, the two connecting portions are required, and hence, there is no change in the number of connecting portions required from the antenna which is provided on the outer side of the vehicle body, leaving the room for improvement.

The invention has been made with a view to solving the problem inherent in the prior art, and an object of the invention is to provide a structure for arranging a planar antenna unit in a vehicle which can reduce the number of connecting portions to facilitate the connecting work of connecting the planar antenna unit with onboard equipment.

A structure for arranging a planar antenna unit in a vehicle according to an aspect of the invention is a structure for arranging in a vehicle a planar antenna unit including a planar antenna provided in a roof of a vehicle, wherein the planar antenna unit includes: a planar antenna including an antenna which receives a radio wave from an outside and an amplifier which amplifies the radio wave received by the antenna; and a long line which outputs a radio wave signal amplified by the amplifier, wherein the planar antenna and the line are formed into a sheet-like structure, and wherein the line is disposed within a pillar of the vehicle such that a leading end portion of the line extends to a position beyond a lower end of the pillar.

According to the structure for arranging a planar antenna unit in a vehicle described above, since the line is provided within the pillar of the vehicle to extend to the lower end of the pillar, the line which extends to the lower end can be connected directly to onboard equipment with no electric wire being interposed therebetween. Consequently, the number of connecting portions can be reduced to facilitate the connecting work of connecting the planar antenna unit with the onboard equipment.

In the structure for arranging a planar antenna unit in a vehicle according to an aspect of the invention, the planar antenna may be provided in a vicinity of any one of four corners of the roof having a substantially quadrangular shape.

According to the structure for arranging a planar antenna unit in a vehicle described above, since the planar antenna is provided in the vicinity of any one of the four corners of the substantially quadrangular roof, it is possible to make the length of the line which is disposed to extend as far as the lower end of the pillar as short as possible.

In the structure for arranging a planar antenna unit in a vehicle according to an aspect of the invention, the planar antenna may be disposed on the roof such that the pillar is positioned in a first direction in which the line extends from the planar antenna, and the first direction and a second direction in which the pillar extends coincide with each other in a plan vie of the vehicle.

According to the structure for arranging a planar antenna unit in a vehicle described above, since the planar antenna is disposed on the roof such that the pillar is positioned in the first direction in which the line extends from the planar antenna, the first direction in which the line extends and the second direction in which the pillar extends coincide with each other in a plan view of the vehicle, it is possible to dispose the line within the pillar while preventing the occurrence of twisting of the line on the roof.

In the structure for arranging a planar antenna unit in a vehicle according to an aspect of the invention, the pillar may include: a pillar main body which supports the roof; a pillar cover which is placed over the pillar main body; and two hook-shaped members which are provided on the pillar main body and which have hook-like shapes to oppose each other in cross-section, and the line may be disposed in a space held by the two hook-shaped members, and may be fixed to the pillar main body.

In the structure for arranging a planar antenna unit in a vehicle according to an aspect of the invention, the pillar may include: a pillar main body which supports the roof; and a pillar cover which is placed over the pillar main body, and the line may be fixed to the pillar main body via an adhesive layer which is provided on a line side or a pillar main body side.

In the structure for arranging a planar antenna unit in a vehicle according to an aspect of the invention, the pillar may include: a pillar main body which supports the roof; and a pillar cover which is placed over the pillar main body, and the line may be fixed to the pillar main body via clip members inserted through a plurality of hole portions formed in a discontinuous fashion along a longitudinal direction of the line on at least one side of the line in a widthwise direction thereof.

In the structure for arranging a planar antenna unit in a vehicle according to an aspect of the invention, the pillar may include: a pillar main body which supports the roof; and a pillar cover which is placed over the pillar main body, and the line may be fixed to the pillar main body by a self-adhesive tape having a self-adhesive layer.

In the structure for arranging a planar antenna unit in a vehicle according to an aspect of the invention, the pillar may include: a pillar main body which supports the roof; and a pillar cover which is placed over the pillar main body, and the line may be wrapped with a self-fusing tape having a self-fusing property with a material of the pillar main body, and may be fixed to the pillar main body via the self-fusing tape.

According to the structure for arranging a planar antenna unit in a vehicle described above, the line can be fixed in place within the pillar, and therefore, it is possible to prevent the occurrence of a situation in which abnormal noise is produced as a result of the line being caused to collide against the pillar by vibrations generated in the vehicle.

According to an aspect of the invention, it is possible to provide the structure for arranging a planar antenna unit in a vehicle which can reduce the number of connecting portions to thereby facilitate the connecting work of connecting the planar antenna unit with the onboard equipment.

DETAILED DESCRIPTION

Hereinafter, the invention will be described by reference to a preferred embodiment. It should be noted that the invention is not limited to the embodiment which will be described below and that the invention can be altered or modified as required without departing from the spirit and scope of the invention. In addition, in the embodiment which will be described below, although some configurations will be not be illustrated or described, needless to say, the details of the configurations or techniques which are not described adopt the techniques which are publicly or generally known as required to such an extent that the techniques adopted do not contradict to techniques which will be described below.

Figure 1:
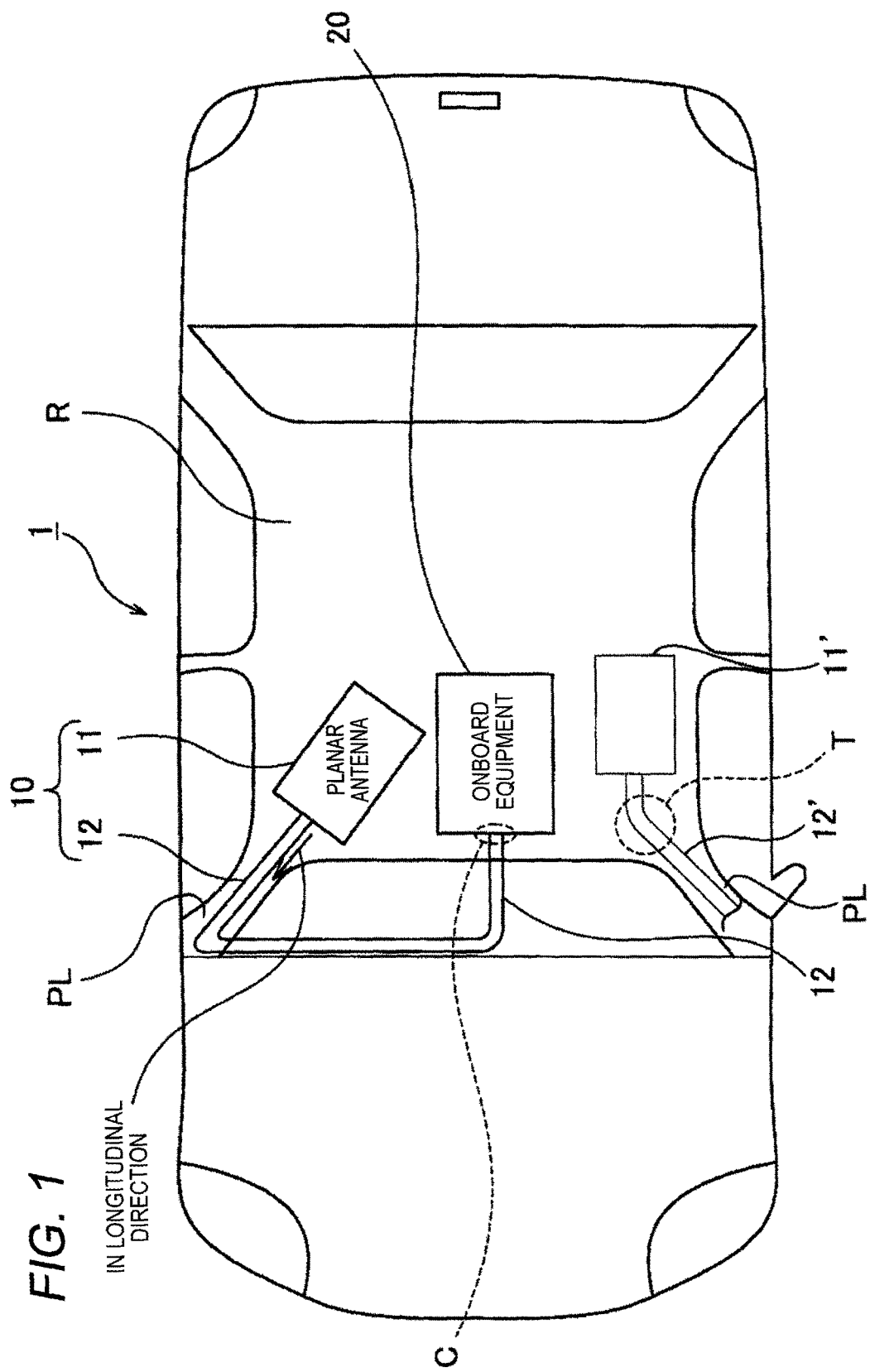
FIG. 1 is a top view of a vehicle showing a structure for arranging a planar antenna unit in a vehicle according to an embodiment of the invention.

FIG. 1 is a top view of a vehicle showing a structure for arranging a planar antenna unit in a vehicle according to an embodiment of the invention. As shown in FIG. 1, a structure 1 for arranging a planar antenna unit 10 in a vehicle represents a structure in which the planar antenna unit 10 including a planar antenna 11 provided in a roof R of the vehicle is arranged in the vehicle. In this embodiment, the structure is intended to connect the planar antenna unit 10 with onboard equipment 20. The planar antenna unit 10 includes the planar antenna 11 and a line 12. The roof R is made up of a resin (for example, a fiber-reinforced resin) which makes up a part of a vehicle body and a decorative panel which is affixed to the resin from an interior of a passenger compartment. The planar antenna 11 is provided in a gap defined between the resin and the decorative panel.

Figure 2:
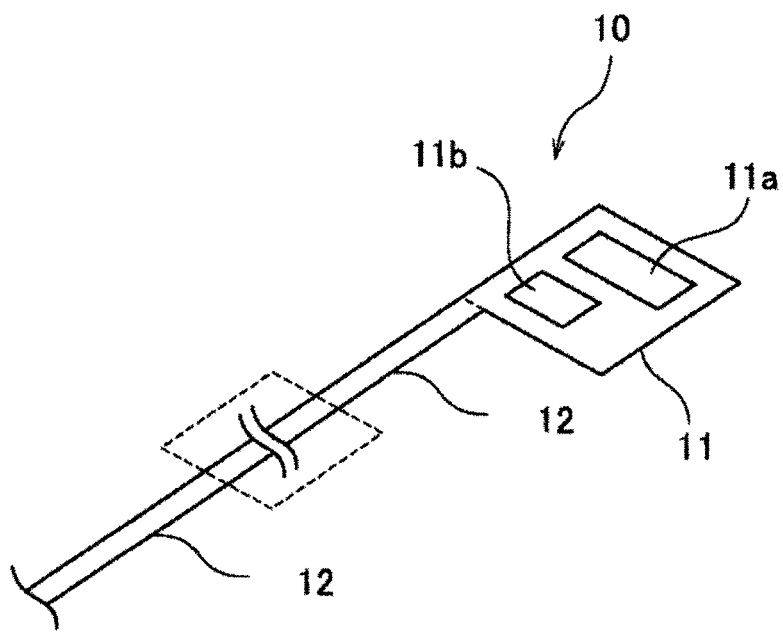
FIG. 2 is a perspective view showing the planar antenna unit shown in FIG. 1.

FIG. 2 is a perspective view showing the planar antenna unit 10 shown in FIG. 1. As shown in FIG. 2, the planar antenna 11 includes an antenna 11a which receives a radio wave from the outside and an amplifier 11b which amplifies the radio wave which the antenna 11a receives. The line 12 makes up a long single line which outputs a radio wave signal which is amplified by the amplifier 11b. In the planar antenna unit 10, these constituent elements 11, 12 are formed into a sheet-like structure, for example, by forming copper foils on a resin film which is a base material.

Figure 3:
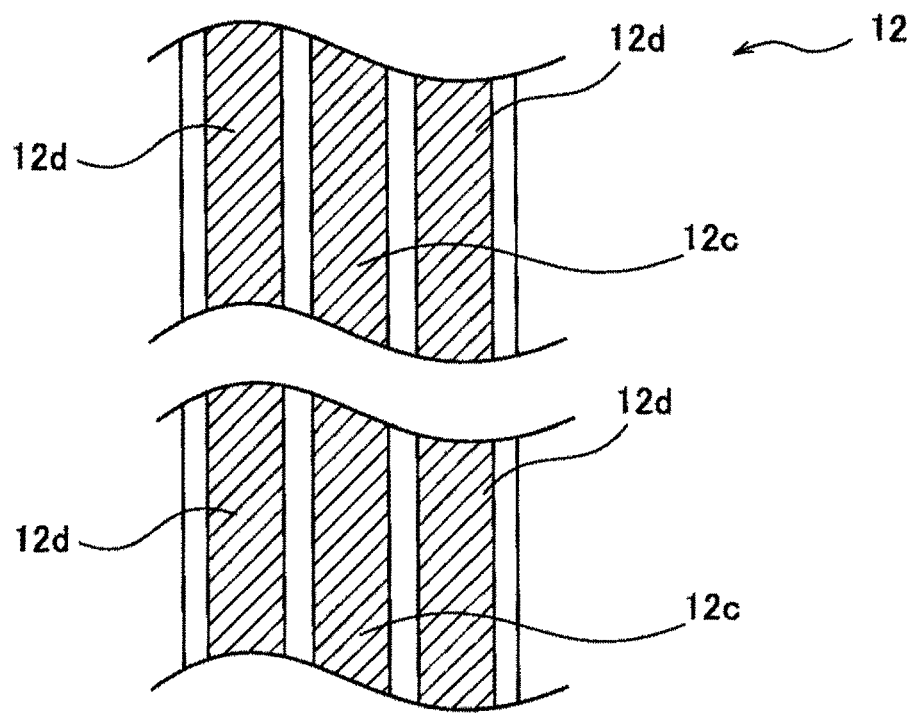
FIG. 3 is a plan view of a line shown in FIGS. 1 and 2 showing details inside a frame indicated by broken lines in FIG. 2.

FIG. 3 is a plan view showing details of the line 12 shown in FIGS. 1 and 2 and shows the details inside a frame indicated by broken lines in FIG. 2. As shown in FIG. 3, the line 12 shows a TEM line. For example, in the case of a coplanar line, the line 12 includes a signal output portion 12c which outputs a radio wave signal which is amplified by the amplifier 11b and shield portions 12d which are formed on both side edges of the signal output portion 12c. The shield portions 12d are made of, for example, a copper foil.

The signal output line 12c is covered by the shield portions 12d which are metallic portions on both the sides thereof, whereby a shield structure is made up. The shield portions 12d are grounded. The ground connection may be executed on the side of the onboard equipment 20 or on the side of the planar antenna 11 by forming a ground portion on the planar antenna 11. There is no limitation to the method of executing the ground connection here.

Figure 4:
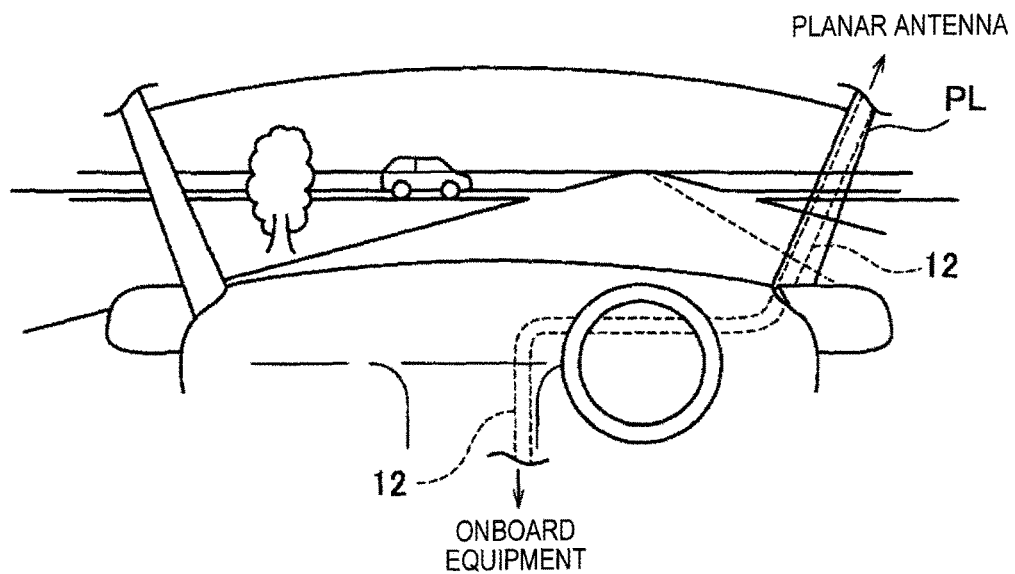
FIG. 4 is a front view resulting when looking at the front of the vehicle from an interior of a passenger compartment, showing the structure for arranging a planar antenna unit in a vehicle shown in FIG. 1.

FIG. 4 is a front view resulting when looking at the front of the vehicle from an interior of a passenger compartment, showing the structure for arranging a planar antenna unit in a vehicle shown in FIG. 1. As shown in FIGS. 1 and 4, the line 12 of the planar antenna unit 10 is laid out in an A pillar (a pillar) PL having a hollow interior in such a way that a leading end portion C of the line 12 extends as far as a portion which lies beyond a lower end of the A pillar PL. In particular, in this embodiment, the line 12 extends to such an extent that the leading end portion C reaches the onboard equipment 20. Owing to this, the planar antenna unit 10 is connected with the onboard equipment 20 only at the leading end portion C of the line 12, thereby making it possible to reduce the number of connecting portions.

Although the line 12 is made up of the coplanar line in this embodiment, the invention is not limited thereto, and hence, the line 12 may be made up of a strip line.

Here, as shown in FIG. 1, the planar antenna 11 according to this embodiment is provided near any one of four corners of the roof R having a substantially quadrangular shape. Specifically speaking, the planar antenna 11 is provided in one corner of the roof R which lies near a portion above a driver's seat. Owing to this, compared with a case where the planar antenna 11 is provided in a central portion of the roof R, the length of the line 12 which is disposed to extend as far as the lower end of the A pillar PL can be made as short as possible.

Further, the planar antenna 11 is disposed relative to the roof R so that the A pillar PL is positioned along a direction in which the line 12 extends from the planar antenna 11 (a longitudinal direction in FIG. 1). Namely, as shown in FIG. 1, the line 12 extends from one side of the planar antenna 11 having a substantially quadrangular shape, and the A pillar PL is positioned in the direction in which the line 12 so extends. In particular, when looking at the vehicle from thereabove, the direction in which the A pillar PL extends and the direction in which the line 12 extends substantially coincide with each other.

For example, in the event that a planar antenna 11' is disposed as indicated by thin lines in FIG. 1, a twisting portion T is formed in a line 12' for the line 12' to be laid out in an A pillar PL. However, a twisting portion T is prevented from being formed in the line 12 by causing the direction in which the A pillar PL extends and the direction in which the line 12 extends to coincide with each other when looking at the vehicle from there alone. This enables the line 12 to be disposed within the A pillar PL without generating a twist in the line 12 on the roof R.

Here, the line 12 is fixed in place within the A pillar PL as will be described below. FIGS. 5 to 10 are sectional views showing fixing methods of the line 12. As shown in FIGS. 5 to 10, the A pillar PL includes a pillar main body PL1 which supports the roof R and a pillar cover PL2 having a substantially U-shaped section which is placed over the pillar main body PL1. Although the pillar main body PL1 is a member which is formed of metal in a conventional vehicle, in this embodiment, a resin (for example, a fiber-reinforced resin) is used for the pillar main body PL1. In addition, the pillar cover PL2 is also made of a resin, and a passenger compartment side of the pillar cover PL2 is made up of a decorative panel of a predetermined color.

Figure 5:
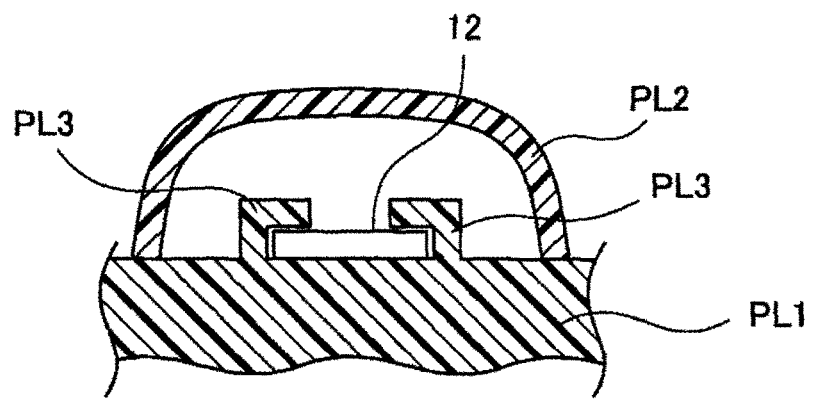
FIG. 5 is a sectional view of a first fixing structure showing a fixing method for fixing the line adopted in the fixing structure.

FIG. 5 shows a first fixing structure. As shown in FIG. 5, in the first fixing structure, two hook-shaped members PL3 are formed on the pillar main body PL1, and the two hook-shaped members PL3 have facing hook-like shapes (L-like shapes) in a section which is at right angles to a longitudinal direction thereof. The line 12 is disposed within a space held by the two hook-shaped members PL3 so as to be fixed to the pillar main body PL1.

The two hook-shaped members PL3 may be provided in a discontinuous fashion along the longitudinal direction of the pillar main body PL1 or may be provided continuously along the full length of the longitudinal direction.

Figure 6:
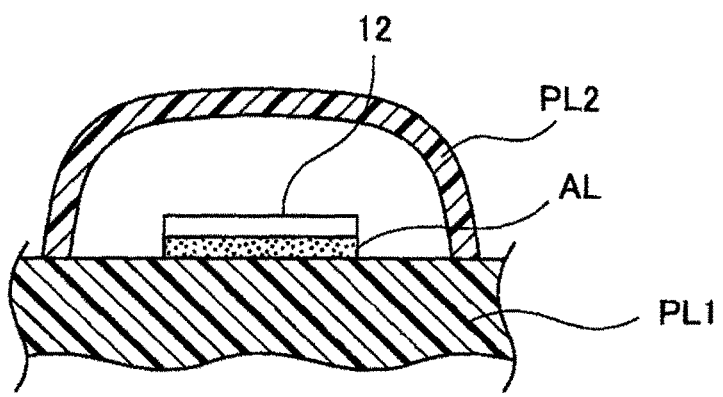
FIG. 6 is a sectional view of a second fixing structure showing a fixing method for fixing the line adopted in the fixing structure.

FIG. 6 shows a second fixing structure. As shown in FIG. 6, in the second fixing structure, the line 12 is fixed to the pillar main body PL1 via an adhesive layer AL which is provided on the side of the line 12 or the side of the pillar main body PL1.

Figure 7A:
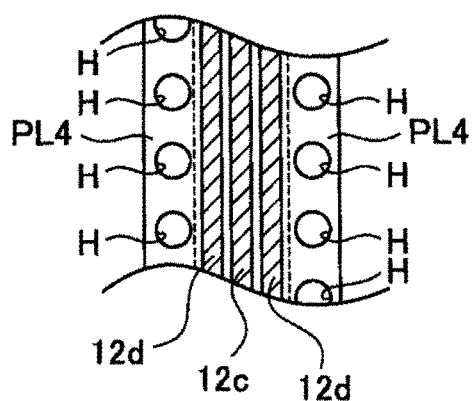
FIGS. 7A and 7B are views of a third fixing structure showing a fixing method for fixing the line adopted in the fixing structure.
Figure 7B:
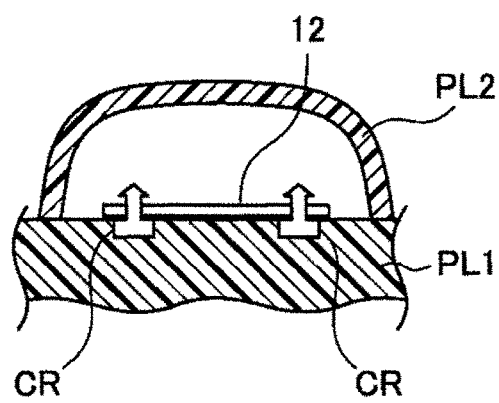

FIGS. 7A and 7B show a third fixing structure. FIG. 7A shows the line 12, and FIG. 7B shows a section of the A pillar PL. Firstly, as shown in FIG. 7A, according to the third fixing structure, a line 12 has play portions PL4 formed on both sides of the line 12 in a widthwise direction thereof (on outer sides of the two shield portions 12d), and the signal output portion 12c and the shield portion 12d are not formed on the play portions PL4. A plurality of hole portions H are formed on each of the play portions PL4 in a discontinuous fashion along a longitudinal direction of the play portion PL4.

As shown in FIG. 7B, a plurality of clip members CR are embedded in the pillar main body PL1. The plurality of the clip members CR has a root side which is embedded in the pillar main body PL1 side and a distal end which has an umbrella shape which projects towards the pillar cover PL2 side.

In the third fixing structure, the plurality of clip members CR are inserted through the plurality of hole portions H which are formed in the line 12, whereby the line 12 is fixed to the pillar main body PL1 while being prevented from being dislocated from the pillar main body PL1 by means of the umbrella shaped distal ends of the clip members CR.

Figure 8A:
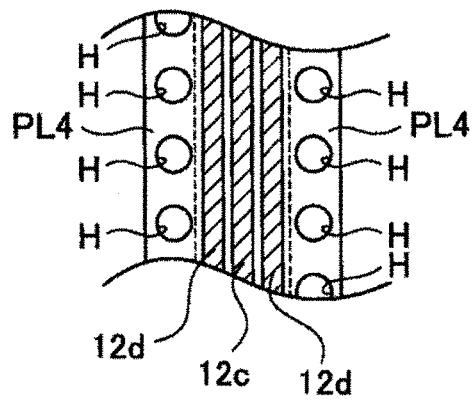
FIGS. 8A and 8B are views of a fourth fixing structure showing a fixing method for fixing the line adopted in the fixing structure.
Figure 8B:
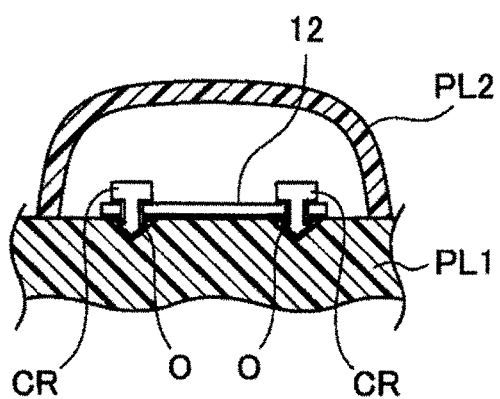

FIGS. 8A and 8B show a fourth fixing structure. FIG. 8A shows the line 12, and FIG. 8B shows the section of the A pillar PL. Firstly, as shown in FIG. 8A, a line 12 according to the fourth fixing structure is similar to the line according to the third fixing structure.

As shown in FIG. 8B, a plurality of hole portions O are formed in the pillar main body PL1 in the same way in which the plurality of hole portions H are formed in the line 12. In the fourth fixing structure, a plurality of clip members CR are inserted through the plurality of hole portions H in such a state that the plurality of hole portions H are caused to coincide with the plurality of hole portions O. Each of the plurality of clip members CR has a T-shaped section and a distal end of an umbrella shape, so that the distal ends fit in the hole portions O of the pillar main body PL1 when the clip members CR are inserted through the hole portions H, whereby the clip members CR are prevented from being dislocated from the hole portions O by means of the umbrella-shaped distal ends of the clip members CR, enabling the line 12 to be fixed to the pillar main body PL1.

Figure 9:
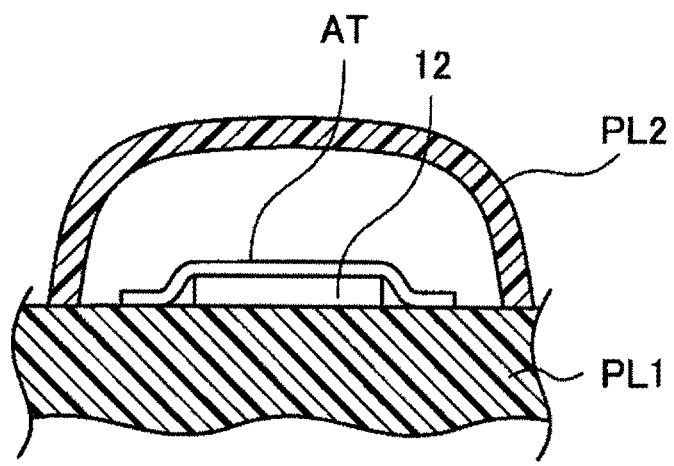
FIG. 9 is a sectional view of a fifth fixing structure showing a fixing method for fixing the line adopted in the fixing structure.

FIG. 9 shows a fifth fixing structure. As shown in FIG. 9, in the fifth fixing structure, the line 12 is fixed to the pillar main body PL1 by means of a self-adhesive tape AT having a self-adhesive layer (for example, a vinyl tape). Here, a configuration may be adopted in which a metallic layer is also formed on the self-adhesive tape AT to thereby ensure the shield properties of the shield portions 12d.

Figure 10:
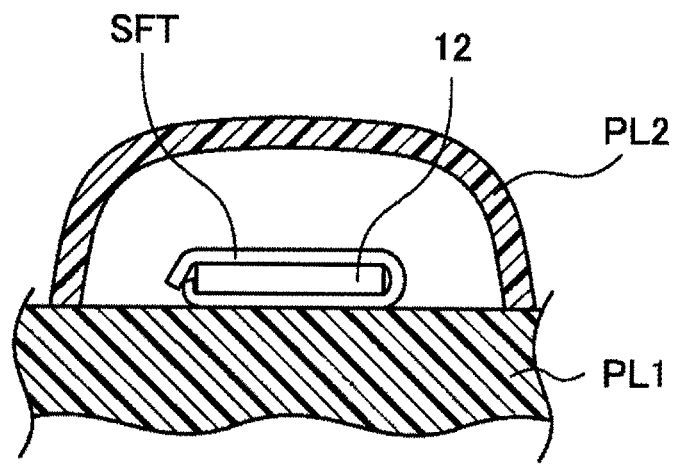
FIG. 10 is a sectional view of a sixth fixing structure showing a fixing method for fixing the line adopted in the fixing structure.

FIG. 10 shows a sixth fixing structure. As shown in FIG. 10, in the sixth fixing structure, the line 12 is fixed to the pillar main body PL1 via a self-fusing tape SFT which is wrapped around the line 12, and this self-fusing tape SFT has self-fusing properties to a material of the pillar main body PL1. Here, in the sixth fixing structure, a butyl rubber is used as the self-fusing tape SFT, and a butyl rubber is provided on a surface side of the pillar main body PL1, whereby the line 12 is fixed to the pillar main body PL1 by means of the self-fusing properties of the butyl rubbers so used and provided.

Next, a method for arranging the planar antenna unit 10 in the vehicle according to the embodiment will be described.

Firstly, the planar antenna 11 is attached, for example, to a decorative panel which makes up the roof R of the vehicle. As this occurs, the planar antenna 11 is attached to the decorative panel so as to be provided in any one of corners of the substantially quadrangular roof R. Further, the planar antenna 11 is attached to the decorative panel so that the longitudinal direction of the line 12 coincides with the longitudinal direction of the A pillar PL when looking at the vehicle from thereabove.

Then, the decorative panel is fixedly attached to the roof R by means of vehicle clamps. Next, the line 12 is fixed to the pillar main body PL1 of the A pillar PL. As the fixing method for fixing the line 12 to the pillar main body PL1, any one of the fixing structures shown in FIGS. 5 to 10 is used.

Thereafter, the pillar cover PL2 is attached to the pillar main body PL1. By doing so, the line 12 is disposed within the A pillar PL. In addition, in this state, the leading end portion C of the line 12 extends as far as the portion which lies beyond the lower end of the A pillar PL or extends near the onboard equipment 20.

For example, a connector is attached to the leading end portion C of the line 12, and the connector is connected to the onboard equipment 20. By executing the operations described heretofore, the arrangement of the planar antenna unit 10 in the vehicle is completed.

In this way, according to the structure for arranging the planar antenna unit 10 in the vehicle according to the embodiment, the line 12 is disposed within the A pillar PL of the vehicle so as to extend as far as the lower end of the A pillar PL, and therefore, the line 12 which extends as far as the lower end of the A pillar PL can be connected directly to the onboard equipment 20, thus obviating the necessity of interposing an electric wire between the line 12 and the onboard equipment 20. Consequently, the number of connecting portions can be reduced to thereby facilitate the connecting work of connecting the planar antenna unit 10 with the onboard equipment 20.

In addition, since the planar antenna 11 is provided near any one of the four corners of the substantially quadrangular roof R, the length of the line 12 which is disposed so as to extend as far as the lower end of the A pillar PL can be made as short as possible.

Additionally, since the planar antenna 11 is disposed relative to the roof R so that the A pillar PL is positioned along the direction in which the line 12 extends and that the direction in which the line 12 extends and the direction in which the A pillar PL extends coincide with each other when looking at the vehicle from thereabove, the line 12 can be disposed within the A pillar PL while preventing the occurrence of a twist in the line 12 on the roof R.

Since the line 12 can be fixed in place within the A pillar PL by using any one of the first to sixth fixing structures, it is possible to prevent the occurrence of a situation in which abnormal noise is generated as a result of the line 12 being caused to collide against the A pillar PL by vibrations generated in the vehicle.

Thus, while the invention has been described heretofore based on the embodiment, the invention is not limited to the embodiment, and hence, alterations or modifications may be made thereto without departing from the spirit and scope of the invention. Alternatively, the other techniques which are publicly or generally known may be combined as required where allowed.

For example, while the line 12 is disposed within the A pillar PL in the embodiment, the invention is not limited thereto. Hence, the line 12 may be disposed within a B pillar or a C pillar.

Additionally, in FIGS. 7A and 7B and FIGS. 8A and 8B, while the play portions PL4 are provided on both the sides of the line 12 in the widthwise direction thereof and the pluralities of hole portions H are formed in the play portions PL4 or on both the sides of the line 12 in the widthwise direction thereof, the invention is not limited thereto. Hence, the play portion PL4 and the plurality of hole portions H may be formed on either of the sides of the line 12 in the widthwise direction thereof.

What is claimed is:

1. A structure for arranging in a vehicle a planar antenna unit, the planar antenna unit comprising:
    a planar antenna provided in a roof of the vehicle; and
    a long line,
    wherein the planar antenna comprises an antenna which receives a radio wave from an outside and an amplifier which amplifies the radio wave received by the antenna,
    wherein the long line outputs a radio wave signal amplified by the amplifier,
    wherein the planar antenna unit further comprises a sheet,
    wherein the antenna, the amplifier, and the long line are provided on the sheet,
    wherein the long line is disposed within a pillar of the vehicle such that a leading end portion of the long line extends to a position beyond a lower end of the pillar, and
    the leading end portion of the long line, which extends to the position beyond the lower end of the pillar, is provided on the sheet which includes the amplifier and the antenna, and the sheet extends from the roof to the position beyond the lower end of the pillar.

2. The structure for arranging a planar antenna unit in a vehicle according to claim 1,
    wherein the planar antenna is provided in a vicinity of any one of four corners of the roof having a substantially quadrangular shape.

3. The structure for arranging a planar antenna unit in a vehicle according to claim 1,
    wherein the planar antenna is disposed on the roof such that the pillar is positioned in a first direction in which the long line extends from the planar antenna, and the first direction and a second direction in which the pillar extends coincide with each other in a plan view of the vehicle.

4. The structure for arranging a planar antenna unit in a vehicle according to claim 1,
    wherein the pillar comprises: a pillar main body which supports the roof; a pillar cover which is placed over the pillar main body; and two hook-shaped members which are provided on the pillar main body and which have hook-like shapes to oppose each other in cross-section, and
    wherein the long line is disposed in a space held by the two hook-shaped members, and is fixed to the pillar main body.

5. The structure for arranging a planar antenna unit in a vehicle according to claim 1,
    wherein the pillar comprises: a pillar main body which supports the roof; and a pillar cover which is placed over the pillar main body, and
    wherein the long line is fixed to the pillar main body via an adhesive layer which is provided on a line side or a pillar main body side.

6. The structure for arranging a planar antenna unit in a vehicle according to claim 1,
    wherein the pillar comprises: a pillar main body which supports the roof; and a pillar cover which is placed over the pillar main body, and
    wherein the long line is fixed to the pillar main body via clip members inserted through a plurality of hole portions formed in a discontinuous fashion along a longitudinal direction of the long line on at least one side of the long line in a widthwise direction thereof.

7. The structure for arranging a planar antenna unit in a vehicle according to claim 1, wherein the pillar comprises: a pillar main body which supports the roof; and a pillar cover which is placed over the pillar main body, and wherein the long line is fixed to the pillar main body by a self-adhesive tape having a self-adhesive layer.

8. The structure for arranging a planar antenna unit in a vehicle according to claim 1, wherein the pillar comprises: a pillar main body which supports the roof; and a pillar cover which is placed over the pillar main body, and wherein the long line is wrapped with a self-fusing tape having a self-fusing property with a material of the pillar main body, and is fixed to the pillar main body via the self-fusing tape.

9. The structure for arranging a planar antenna unit in a vehicle according to claim 1, wherein the antenna, the amplifier, and the long line are provided on the sheet without a connection member coupling the long line with the planar antenna, and wherein the leading end portion of the long line extends to a position of an in-vehicle device beyond the lower end of the pillar.

\* \* \* \* \*